R. B. BENJAMIN.
FISHING REEL.
APPLICATION FILED DEC. 13, 1910.
1,172,422.
Patented Feb. 22, 1916.
3 SHEETS—SHEET 1.
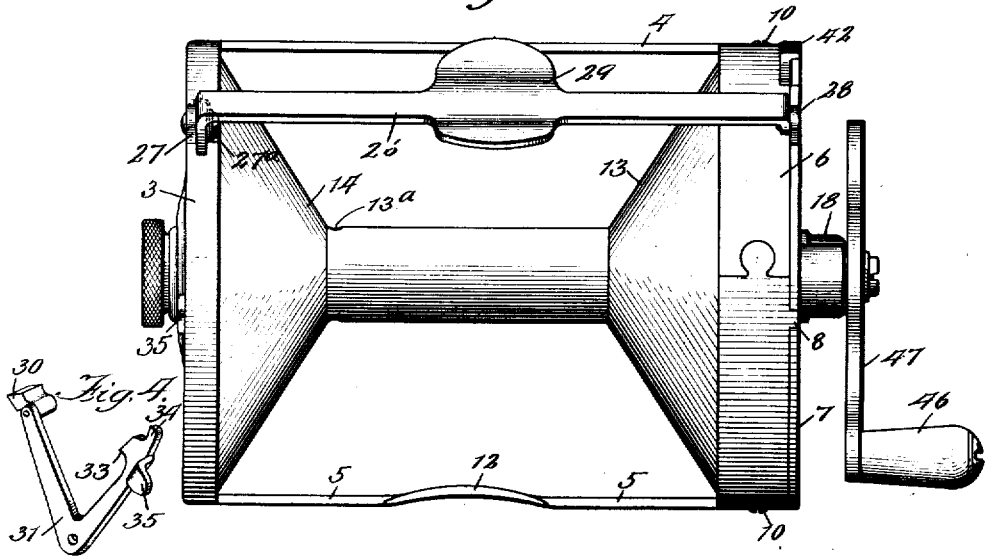
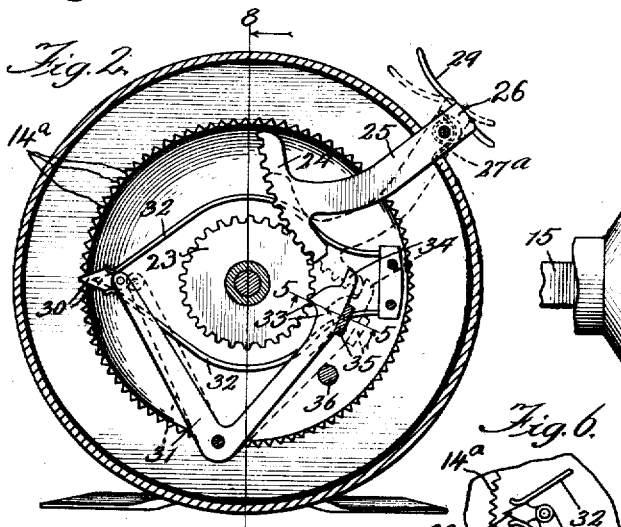
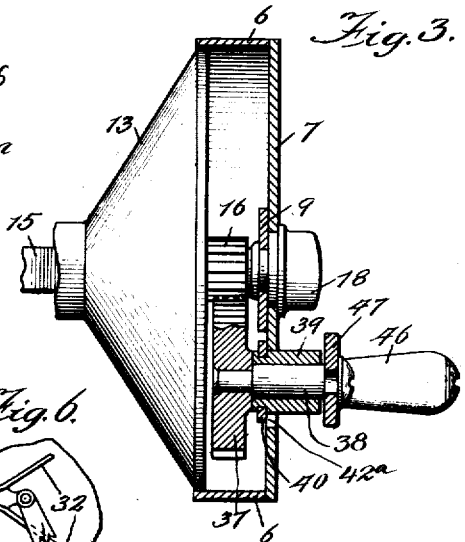
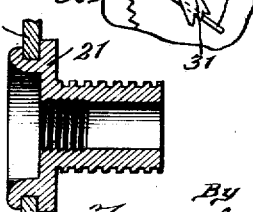
Inventor:
Reuben B. Benjamin
By James Addington, Amor Liebold
Attys

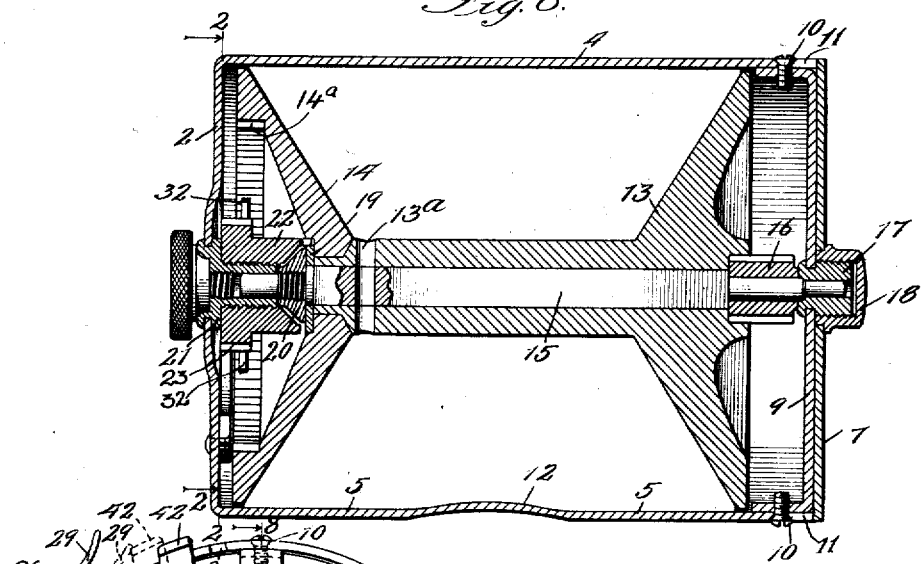

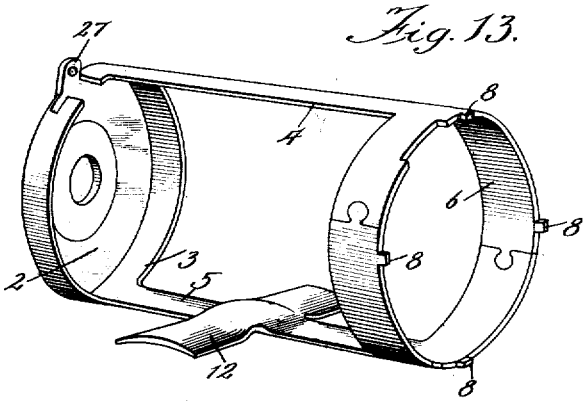
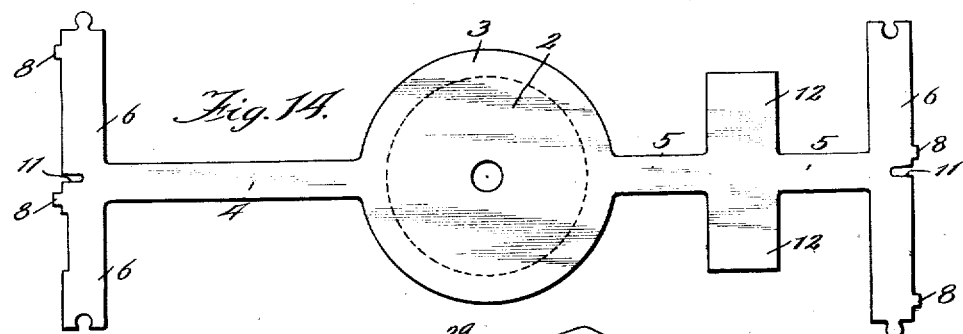
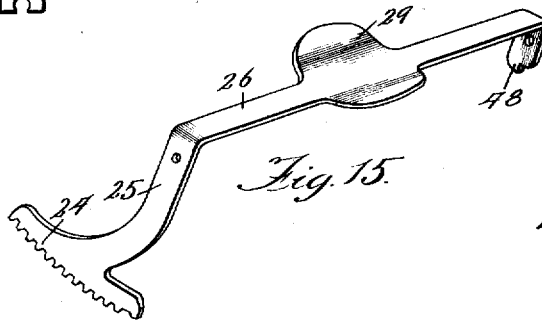
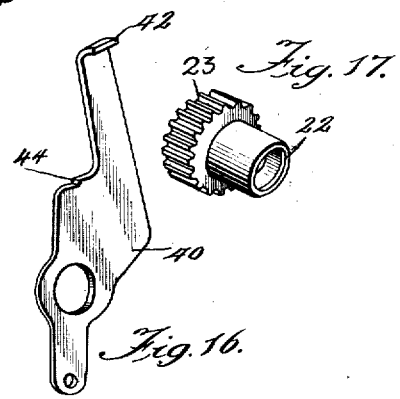
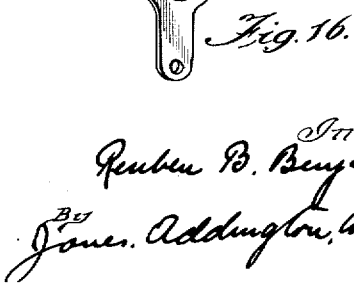

UNITED STATES PATENT OFFICE.

REUBEN B. BENJAMIN, OF CHICAGO, ILLINOIS, ASSIGNOR TO BENJAMIN-SELLAR MFG. CO., OF CHICAGO, ILLINOIS, A CORPORATION OF ILLINOIS.

FISHING-REEL.

1,172,422.  Specification of Letters Patent.  Patented Feb. 22, 1916.

Application filed December 13, 1910. Serial No. 597,084.

*To all whom it may concern:*

Be it known that I, REUBEN B. BENJAMIN, a citizen of the United States, residing at Chicago, in the county of Cook and State of Illinois, have invented new and useful Improvements in Fishing-Reels, of which the following is a full, clear, concise, and exact description reference being had to the accompanying drawing, forming a part of this specification.

My invention relates to improvements in fishing reels, my objects being to provide a reel that an average fisherman can use to accomplish results ordinarily achieved only by experts with the reels now in common use, to provide entirely new features of advantage which enable a more expert use of the reel than heretofore, particularly in casting, and to provide a device of this class that is simple in construction and comparatively inexpensive to manufacture.

Further objects and advantages will appear from the description and claims to follow.

Referring to the accompanying drawings, which illustrate one specific embodiment of my invention, and in which the same reference characters are used throughout for like parts—Figure 1 is a side elevation of the device; Fig. 2 is a cross sectional view taken on the line 2—2 of Fig 8; Fig. 3 is a detail sectional view of the winding mechanism taken on the line 3—3 of Fig 9; Fig. 4 is a detail perspective view of the clicking lever; Fig. 5 is a cross sectional view of a detail thereof taken on the line 5—5 of Fig. 2; Fig. 6 is a detail view of the clicking dog and coöperating springs; Fig. 7 is a detail cross sectional view of the journal bearing for the spool shaft at the left-hand end of the reel; Fig. 8 is a longitudinal sectional view of the device taken on the line 8—8 of Figs. 2, 9 and 10; Fig. 9 is a view of the right-hand end of the reel with the end plate removed; Fig. 10 is an end elevation of the right-hand end of the reel; Fig. 11 is a detail perspective view of the washer forming part of the braking mechanism; Fig. 12 is a detail view showing the key slots by which the right-hand end of the frame of the reel is secured in position; Fig. 13 is a perspective view of the main portion of the frame showing how this is constructed; Fig. 14 is an outlined view of the blank from which the portion of the frame shown in Fig. 13 is made; Fig. 15 is a perspective view of the thumbing lever; Fig. 16 is a similar view of the lever carrying the winding gear; Fig. 17 is a like view of the braking or friction sleeve forming part of the thumbing mechanism; and Fig. 18 is a detail perspective view of the locking dog for holding the winding gear in position.

The frame of the reel is preferably made from sheet metal, a blank substantially of the form indicated in Fig. 14 being first punched, stamped or otherwise suitably formed from the metal sheet, the central disk thereof being bent or formed up to make one end of the frame, as shown in Fig. 13, consisting of the end plate 2 and end ring 3. From the latter the two side bars 4 and 5 extend longitudinally to the cross members at the ends of said bars which are curved into the form of a circle with their tongued ends engaging and soldered, brazed, or otherwise secured together to form the opposite end ring 6 of the reel frame. The latter end plate 7 of the frame is a flat or substantially flat plate similarly formed from sheet metal and is of the proper size to cover the said end of the frame, suitable peripheral notches being provided to accommodate the lugs 8 projecting at the desired intervals from the end ring 6 of the frame. The end plate 7 is removably secured to the frame by means of the narrow plate or strip 9 (see Figs. 8 and 9), preferably of the same sheet material, riveted or otherwise solidly secured to the inner side of the plate 7 and having the inwardly turned ends fitting the inner side of the ring 6 and secured thereto by the screws 10 passing through key slots 11 (see Figs. 8 and 12) in said ring 6, and threading into said inwardly turned ends of the bar 9. The inner sides of the heads of said screws being countersunk and the slots 11 being formed to fit, the parts are firmly and rigidly secured together when the screws 10 are tightened in position, but the end of the frame can be readily taken off by loosening and unscrewing said screws a slight distance so that the latter will slip out of said key slots. The said screws 10 may have enlarged heads forming thumb nuts in case it is desired to remove the head without the use of tools.

The lower side bar 5 of the frame is provided with the reel-seat 12 formed integrally therewith and slightly curved transversely in the usual manner to enable the reel to be secured to the fishing rod. By constructing the frame in this manner the process of manufacture is much simplified and cheapened and a substantial and neat appearing frame is secured. The proportions of the parts may, of course, be varied to suit the requirements of material used, size and proportions of reel or the ideas of the particular designer. I prefer to use sheet brass, and after the parts are formed to nickel plate or otherwise finish the surfaces of the same.

The spool (see particularly Fig. 8) comprises the end and shaft or spindle 13 of hard rubber or suitable material and the end piece 14 of the same material, the latter having a squared opening fitting the squared shoulder on the end of the shaft member 13. The spool members may be molded of the proper size and form or otherwise made. Through the center of the spool a shaft 15, preferably square, passes, its right end being turned down cylindrically and extending through a pinion 16 which is set a short distance into the end of the spool 13, the walls of the depression in the end of the spool fitting into the space between the teeth of the pinion 16. The pinion may be driven into place or it may be molded in the material of the spool. The end of the shaft 15 is extended beyond the pinion 16 to form a bearing in the member 17 which is carried by that end of the frame. The latter member is shouldered so as to bear against the outer face of the cross member 9, the reduced portion thereof projecting through said bar or strip 9 and being upset on the inner side thereof or otherwise secured therein. A screw cap 18 threads on the outer end of said member 17 to cover the same, and which may be readily removed to oil the bearing or for other purposes. At the opposite end of the spool the square shaft 15 is made cylindrical to receive a washer 19, shown in Figs. 8 and 11, is then slightly reduced in diameter and threaded to receive a beveled nut 20, and is extended beyond said nut to form a bearing similar to that at the opposite end of the spool. Since the shaft 15 fits the spool shaft tightly, and the end 14 of the spool, washer 19, and coöperating parts are suitably proportioned, the tightening of the nut 20, serves to bind and rigidly secure all these parts together, the said washer and nut, like the pinion 16 at the opposite end, rotating with the spool.

The end of the shaft 15 is journaled in the bearing member 21 (see Figs. 8 and 7), which is secured to the end 2 of the frame by extending the same through said plate and upsetting or turning the same over on the outer side of said plate. This bearing 21 is threaded interiorly to receive the end of a screw bolt, which can be readily removed for purposes of oiling or otherwise. The inner end of this bearing 21 serves at that end to take up the end thrust of the spool. The bearing member 17 at the other end of the reel serves the same purpose at that end. A hole 13ª is made through the shaft of the spool through which the fishing line may be passed to secure the same to the spool.

As here shown the inner faces of the ends of the spool are inclined at an angle of 60 degrees, or approximately that, whereby the line will not crowd or wedge in at the ends of the spool in the various layers but will lie smoothly in position, each turn of the line lying upon, but midway between, the two turns in the layer beneath.

It is well known that the knack of "thumbing" an ordinary reel while casting is most difficult to acquire and requires long practice and experience to successfully accomplish.

The principle of slowing down a spool by applying pressure on the outer layer of line is wrong as it tends to stop a portion of the outer layer of line only and allows the spool with the remainder of the line to run ahead, thus fluffing the line which tends to tangle it. The brake or retarding force should be applied directly to the spool. In order to carry out this principle in my invention and to render the operation of casting comparatively easy, I provide a brake or retarding device applied to the spool body, which is readily operated by the pressure of the thumb in its natural position while using the rod, whereby one is able to accomplish the useful results sought in the ordinary "thumbing" operation, but is not required to have the skill of an expert. In the specific form in which this feature is here embodied the washer 19 is provided with spring tongues 19ª outside the periphery of the nut 20 which project above the plane of the outer face of said washer, as indicated in Figs. 8 and 11. The outside of the bearing sleeve 21 is threaded preferably with square threads (Fig. 7). Threaded on these is the sleeve 22 (Figs. 8 and 17) which is provided at its inner end with bearing surfaces adapted, when moved longitudinally to the right, to engage first the spring tongues 19ª of the washer 19 and then the beveled face of the nut 20, to apply a braking friction to the spool. During the early stages of this movement the friction is slighter since only the spring tongues of the washer are engaged, but when the sleeve 22 is brought up hard against the washer and conical nut, it is enough to stop the rotation of the spool. The braking force thus gradually increases from the least to the greatest amount of which the device is capable of exerting. This sleeve 22 is rotated in the following manner: At its outer end it is provided with a pinion or is made in the form of a pinion 23 which is engaged by a segmental gear 24 carried on an arm 25 formed on one end of a bar 26 (Figs. 1, 2 and 15), extending from one end of the frame to the other and pivoted to a lug 27 formed up out of the ring 3 of the frame at that end and to a projection or ear 28 on the opposite end plate 7 of the frame. A thumb piece 29 on the bar 26 enables the person using the rod to rotate the bar 26 on its pivots, thus operating the segmental gear 24 and rotating the sleeve 22, thereby causing it to travel longitudinally and toward the spool and engaging the spring washer, etc., as above set forth. A coil spring 27ª on the left-hand pivot having one end caught in the opening in the ring 3 where the ear or lug 27 is cut out and the other around the edge of the arm 25, serves to return the thumbing or brake mechanism to its normal position when the pressure of the thumb is relieved from the lever.

The "click", shown more fully in Fig. 2, consists of the heart shaped dog 30 (see also Figs. 4 and 6) carried at one end of the bell-crank lever 31 (Fig. 4) which is pivoted at its angle to the inside face of the end plate 2 of the frame. Two springs 32, 32, bear on opposite sides of said dog and are secured at their opposite ends in any desired manner to the inside of the end plate 2. The dog engages in the notches 14ª formed in the edge of the depression formed in the end 14 of the spool. When in the position shown in full lines in Fig. 2, that is, in "clicking" position, the outwardly curved ends of said springs bear against and in the rear of the widened or head part of the heart shaped dog 30 and said dog is held forward in its working position although it is allowed to snap over the notches when the spool is rotated in either direction. When the dog is withdrawn, as hereinafter explained, and is in the dotted line position, (also as shown in Fig. 6) then said springs bear on the dog toward the point of the same and said springs then tend to hold the dog out of engagement with the notches in the spool or out of its "clicking" position. The other arm of the elbow lever 31 is provided with a locking tooth or pawl 33 adapted to engage with the teeth of the pinion 23 when the "click" is thrown forward into "clicking" position. This enables a heavier drag to be put on the spool than that afforded by the "click" alone, since by depressing the thumb piece 29 of the thumbing mechanism, the pinion 23 and sleeve 22 are rotated to apply a braking pressure or additional drag to the spool through the mechanism heretofore described, and the pawl 33 catching in the teeth of the pinion holds the brake in its depressed or applied position. This may be utilized in trolling, or at other times when desired.

In trolling, the amount of the drag necessarily depends upon the nature of the bait, the weight and length of the line and the speed of the boat and current, if any. The variable drag provided in this invention by the lock and friction brake, with its variable braking force, takes care of all these conditions. The raising of the lever by the teeth of the pinion 23 passing under the pawl 33 is not sufficient to shift the dog 30 to its backward position between the springs 32 and said springs tend to press the dog 30 as well as the pawl 33 into engagement with their respective coöperating parts. The end 34 of the arm carrying the locking pawl 33 is extended into the path of the adjacent end of the segmental gear 24, whereby when the thumbing or brake lever 29 is depressed to its full extent said gear strikes the end 34 and pushes it back to such an extent that the pawl 33 is freed from the pinion 23 and the clicking dog 30 is moved back to its dotted line position in Fig. 2 and as seen in Fig. 6 with the springs 32 bearing on the forward part thereof, with the result that the said lever 31 remains in this position until positively moved forward again into "clicking" position. The latter is accomplished by a projection 35 which extends outwardly at right angles from said arm through a suitable opening in the end plate 2 and is then again bent down close to the outer face of said end plate 2, as shown in Figs. 4 and 5, to form a lug or catch by which the lever 31 can be pressed back by hand into clicking position. A suitable stop 36 for said lever 31 may be provided.

In order to wind up the line on the spool the pinion 16, heretofore described, at the right-hand end of spool is engaged by a gear 37 mounted on the shaft 38 which is carried by a sleeve 39 mounted in a lever 40 (Figs. 3, 9 and 16) which is pivoted to the end plate 7 by the screw 41. The opposite end 42 of this lever projects to a point outside of the frame of the reel through a slot formed by a notch cut in the ring 6 of the frame, said end 42 being preferably bent over at right angles so as to rest against the edge of the end plate 7 when the gear 37 is in engagement with the pinion 16. A slot 42ª (Fig. 3) formed in the end plate 7 permits the sleeve 39 to move back and forth when the pivoted lever 40 is moved to throw the gear 37 into or out of engagement with the pinion 16. A dog 43 (Figs. 9 and 18) pivoted to the end plate 7 is adapted to engage in a notch 44 in the lever 40 to hold the gear 37 in mesh with the pinion 16. When said dog is turned so as to free its point from the notch 44 to a coil spring 45 secured at one end to the said lever 40 and the other to said dog, causes the said lever 40 to be drawn back to the dotted line position, thus separating the gear 37 from the pinion 16 and permitting the spool to run free from said gear. By pressing against the end 42 of the lever 40, the gear 37 can be thrown into engagement with the pinion 16, when the spool may be rotated in order to reel in the line by operating the handle 46 on the crank 47 which is suitably secured to the shaft 38. In order that this winding mechanism shall be automatically freed from the spool in casting, or at other desired times, the bar 26 of the thumbing lever is provided at its right-hand end with an extension 48 below or inside the pivot, which is adapted to engage the outer end of the dog 43, whereby, when the said thumbing lever is depressed and the bar 26 rotated on its pivots, the said extension 48 engages the dog 43 and moves its opposite end out of the notch 44 in the lever 40, thereby permitting the latter to be drawn back by the spring 45. The spring 45 serves the double function of drawing the lever 40 outwardly and, when said lever is again depressed, to cause the dog 43 to snap into engagement with the notch 44. It will be noticed that in this preferred arrangement the dog or pawl 43 is thrown out of its notch in the initial movement of the thumbing lever so as to throw said winding or multiplying gear out of action in the early movement of the thumbing lever.

When constructed as above described, the device may be readily taken apart by loosening the screws 10, and withdrawing that end of the frame which carries with it the crank lever 40 and dog 43. The spool may then be bodily removed, leaving the thumbing and clicking parts attached to the frame. The pivot in the lug 28 is secured to the thumbing lever 26 and is not headed on its outer end. The parts are thus readily taken apart for any desired purpose and as readily put together.

In using the reel for casting, the thumb naturally rests on the thumb piece 29 of the thumbing lever 26. On swinging the rod back, the thumb is firmly pressed against the piece 29, which causes the winding mechanism to be thrown out of action, leaving only the pinion 16 to rotate with the spool at that end. At the opposite end of the reel the click, if set, is also thrown back out of operating position and the locking pawl 33 out of engagement with its pinion, so that this end of the spool is also ready to run freely so far as these parts are concerned. At this time, however, the brake operated by the thumb lever 26 is rigidly set and the spool is prevented from rotation and the proper swing can be imparted to the rod and bait.

At the desired moment in the forward swing of the rod, the pressure of the thumb is released from the lever 29 and the coil spring 27$^a$, assisted, if need be, by the pressure of the thumb on the rear part of the thumb piece 29, causes said brake sleeve 22 to rotate backwardly and entirely remove the brake from the spool so that it is free to revolve. At this time the winding gear and the click remain out of action and the rotation of the spool is unretarded. The effect of the coil spring 27$^a$ is also to start or assist in starting the spool rotating at this time or to give it an initial impulse, as it were, since the sleeve 22 which, at the beginning, is in close or gripping frictional contact therewith, rotates, when released, in the same direction as the spool and therefore for a brief instant rotates with it and starts or tends to start it rotating. The bait is thus relieved of that much work in starting the spool and is thereby enabled to travel a proportionately greater distance.

When the bait is traveling through the air and there is a tendency for the spool to spin too rapidly, a slight depression of the lever 29 by the thumb places a delicate braking force on the spool and retards it just sufficiently to prevent the spool from overrunning and the consequent entangling of the line.

At the desired moment a firmer pressure of the thumb stops the spool and drops the bait. By then instantly throwing the gear into position the line can be wound in by the handle 46.

The crank 47 is preferably slightly overweighted so that the handle 46 will hang down, as indicated in the drawings. Thus the user becoming familiar with the reel always knows just where to find and take hold of it.

Although I have shown and described one specific embodiment of my invention, I do not desire to be limited thereto as the same may be embodied in various forms without departing from the spirit or scope of the appended claims.

Having thus described my invention, what I claim as new and desire to secure by Letters Patent, is—

1. In a fishing reel, the combination with a spool, of a friction brake therefor, including a braking member having a longitudinal and rotary movement, thereby to impart a gradually increasing or decreasing braking force to said spool, and a thumb lever for imparting such movement to said member operated by a pressure transverse to the axis of the spool and spring means tending to release said brake whereby when said brake is released said spring means will tend to rotate said spool.

2. In a fishing reel, the combination with a frame, of a spool therein, a threaded support carried by the frame at one end of the spool, a brake for said spool including a sleeve carried by said support and traveling on said threads, a part rotated by said spool, said sleeve being movable into direct frictional engagement with said rotatable part, a thumbing lever carried by the frame, and connections between said lever and said sleeve for operating said sleeve to cause said brake to impart a gradually increasing or decreasing braking effect upon said spool, and spring means tending to release said brake whereby when said brake is released said spring means will tend to rotate said spool.

3. In a fishing reel, the combination with a frame, of a spool mounted to rotate therein, a bearing at one end of the frame for the spool, a braking sleeve mounted to rotate on said bearing and to be moved longitudinally toward the spool when rotated in one direction and away from the same when rotated in the opposite direction, a part rotated by said spool, said sleeve being movable into direct frictional engagement with said rotatable part, a gear carried by said sleeve, a thumbing lever pivoted in the frame and having a segmental gear intermeshing with said gear on the sleeve, and a thumb piece carried by said thumbing lever in position for convenient operation by the natural pressure of the thumb of the operator.

4. In a fishing reel, the combination with a spool, of a variable pressure brake therefor, thumbing means including a thumbing lever for operating said brake to apply a gradually increasing and decreasing braking force to the spool, a lock for said brake movable independently of the thumbing lever to enable the brake to be applied at desired time and with the required braking force as a positive drag on the spool, and means for unlocking the said brake when desired by the thumbing lever.

5. In a fishing reel, the combination with a spool, of a click therefor, a variable friction brake for the spool, thumbing mechanism including a thumb piece midway between the ends of the reel for actuating said brake to apply a gradually increasing or decerasing braking force to said spool, and means engaged by said thumbing mechanism for throwing said click out of operation at the desired times.

6. In a fishing reel, the combination with a spool, of a variable force friction brake therefor applied to the body of the spool, thumbing mechanism for controlling said brake, a lock for said brake movable independently of said thumbing mechanism, and means controlled by the thumbing mechanism for throwing the lock out of operation at the desired times.

7. In a fishing reel, the combination with a spool, of a variable braking force friction brake therefor, a thumbing mechanism for controlling said brake, a lock for the brake movable independently of said thumbing mechanism, a click for the spool, and means controlled by the thumbing mechanism for throwing both said lock and said click out of operation at the desired times.

8. In a fishing reel, the combination with a spool, of a longitudinally moving braking member carried by the frame, said member being adapted to move longitudinally when rotated, a pinion carried thereby, a segmental gear engaging said pinion and operated by a thumbing mechanism for controlling the application of said brake, a locking pawl carried by the frame and adapted to engage in the teeth of said pinion to lock said brake at any desired degree of application.

9. In a fishing reel, the combination with a spool, of a multiplying gear at one end thereof, a thumbing mechanism including a thumbing lever midway of the ends of the reel for controlling the spool during its use in fishing, and means controlled by the thumbing mechanism for throwing said multiplying gear out of action at desired times.

10. In a fishing reel, the combination with a spool, of a friction brake therefor, a thumbing mechanism for applying said brake with varying degrees of braking force at the will of the operator, a winding gear for said spool, and means for throwing the winding gear out of operation by the thumbing mechanism.

11. In a fishing reel, the combination with a spool, of a variable braking force friction brake therefor, thumbing mechanism controlling said brake during the casting operation to apply any desired braking force to the spool, winding means for the spool, a click therefor, means controlled by the thumbing mechanism for freeing the spool from said winding mechanism and said click and placing it under the sole control of the friction brake.

12. In a fishing reel, a spool formed of molded material and having a recess in the end thereof, and a pinion at one end thereof, one end of said pinion fitting into said recess, the material of the spool entering the spaces between the teeth of the pinion.

13. In a fishing reel, a frame formed from an integral sheet of metal having a central disk with diametrically opposite bars projecting therefrom on either side, said bars terminating in enlarged ends and said blank being folded so that said disk forms one end plate and ring and the enlarged ends the ring at the opposite end.

14. In a fishing reel, a frame formed from an integral sheet of metal having a central disk with diametrically opposite bars projecting therefrom on either side, said bars terminating in enlarged ends and said blank being folded so that said disk forms one end plate and ring, and means for uniting said enlarged ends to form the ring at the opposite end of the frame.

15. In a fishing reel, a frame formed from an integral sheet of metal having a central disk with diametrically opposite bars projecting therefrom on either side, said bars terminating in cross bars at right angles thereto and said blank being folded so that said disk forms one end plate and ring, and means for uniting said cross bars to form the other end ring.

16. In a fishing reel, a frame formed from an integral sheet of metal having a central disk with diametrically opposite bars projecting therefrom on either side, said bars terminating in cross bars at right angles thereto and said blank being folded so that said disk forms one end plate and ring, said cross bars having their ends formed to dovetail together to form the opposite end ring.

17. In a fishing reel, a frame formed from an integral sheet of metal having a central disk with diametrically opposite bars projecting therefrom on either side, said bars terminating in cross bars at right angles thereto and one of said bars having a second cross bar intermediate the ends thereof, said blank being folded so that said disk forms one end plate and ring, and means for uniting said terminal cross bars to form the other end ring, said intermediate cross bar forming the reel seat for the completed reel.

18. In a fishing reel, a spool, a brake therefor, means for applying said brake to the body of the spool with a variable pressure, said means including a thumb piece located midway between the ends of the reel, a click for the reel, and means controlled by the pressure of the thumb of the operator on said thumb piece for applying said brake with any desired degree of braking force and for throwing said click out of action.

19. A fishing reel comprising a spool, a part rotated thereby, a friction brake therefor including a braking member having a longitudinal and rotary movement, movable into direct frictional engagement with said rotatable part, and spring means tending to release said brake whereby when said brake is released said spring means will tend to rotate said spool.

In witness whereof, I have hereunto subscribed my name in the presence of two witnesses.

REUBEN B. BENJAMIN.

Witnesses:
  ROBERT LEWIS AMES,
  M. B. LANGE.

It is hereby certified that in Letters Patent No. 1,172,422, granted February 22, 1916, upon the application of Reuben B. Benjamin, of Chicago, Illinois, for an improvement in "Fishing-Reels," errors appear in the printed specification requiring correction as follows: Page 3, line 125, strike out the word "to"; page 5, line 35, claim 4, for the word "and" read *or;* same page, line 49, claim 5, for the word "decerasing" read *decreasing;* and that the said Letters Patent should be read with these corrections therein that the same may conform to the record of the case in the Patent Office.

Signed and sealed this 11th day of April, A. D., 1916.

[SEAL.]

R. F. WHITEHEAD,

*Acting Commissioner of Patents.*

Cl. 242—84.7.